(12) United States Patent
Wallrafen

(10) Patent No.: US 8,198,842 B2
(45) Date of Patent: Jun. 12, 2012

(54) ACTUATING DRIVE AND METHOD FOR OPERATING AN ACTUATING DRIVE

(75) Inventor: Werner Wallrafen, Hofheim (DE)

(73) Assignee: Continental Automotive GmbH, Hannover (DE)

( * ) Notice: Subject to any disclaimer, the term of this patent is extended or adjusted under 35 U.S.C. 154(b) by 719 days.

(21) Appl. No.: 12/390,727

(22) Filed: Feb. 23, 2009

(65) Prior Publication Data
US 2009/0212727 A1 Aug. 27, 2009

(30) Foreign Application Priority Data
Feb. 25, 2008 (DE) .......................... 10 2008 010 964

(51) Int. Cl.
*H02P 6/06* (2006.01)
(52) U.S. Cl. ............................. 318/400.06; 318/400.34
(58) Field of Classification Search ............. 318/400.06, 318/400.34
See application file for complete search history.

(56) References Cited

U.S. PATENT DOCUMENTS
6,791,219 B1 * 9/2004 Eric et al. .................... 310/68 B
6,791,293 B2   9/2004 Kaitani
6,925,401 B2   8/2005 Kameya

FOREIGN PATENT DOCUMENTS
DE   10331562    1/2004
DE   10196894    10/2004

OTHER PUBLICATIONS
German Office Action, German application No. 10 2008 010 964.9, 4 pages, Mar. 19, 2009.

* cited by examiner

*Primary Examiner* — Walter Benson
*Assistant Examiner* — Erick Glass
(74) *Attorney, Agent, or Firm* — King & Spalding L.L.P.

(57) ABSTRACT

The invention relates to a method for operating an actuating drive having an electrically commutated motor 1 for adjusting an actuating member, having a position sensor 6 for detecting the rotary angle position of the rotor of the motor or of an element which can be driven in a rotatable manner by said motor. A motor control unit 9 serves to commutate the motor 1 and to regulate the position of the actuating member, it being possible to supply position signals, which correspond to the position values detected by the position sensor 6, to the motor control unit 9. After the actuating drive is started, uncompensated measured values are detected by the position sensor 6 over at least one full revolution of the rotor or of the element which can be driven in a rotatable manner; corresponding correction values for compensating angle errors are formed in a compensation unit 11. The correction values are fed to a memory unit 14 for storage purposes, and the errors in the position values, which are detected during further operation, are compensated with the correction values and are fed to a commutation unit 12 and to a position regulation unit 13 of the motor control unit 9.

23 Claims, 1 Drawing Sheet

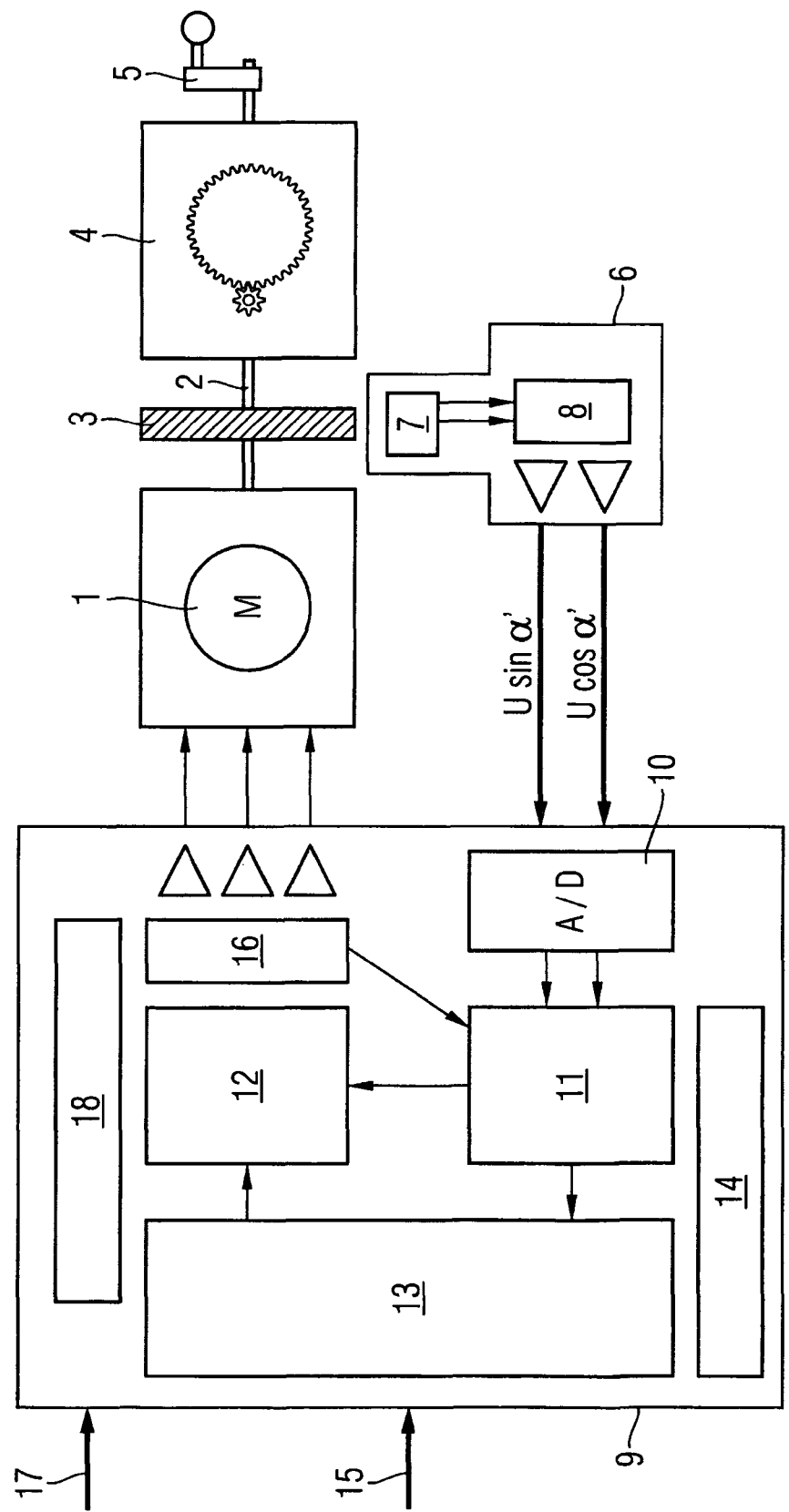

ACTUATING DRIVE AND METHOD FOR OPERATING AN ACTUATING DRIVE

CROSS-REFERENCE TO RELATED APPLICATIONS

This application claims priority to DE Patent Application No. 10 2008 010 964.9 filed Feb. 25, 2008, the contents of which is incorporated herein by reference in its entirety.

TECHNICAL FIELD

The invention relates to a method for operating an actuating drive having an electrically commutated motor for adjusting an actuating member, having a position sensor for detecting the rotary angle position of the rotor of the motor or of an element which can be driven in a rotatable manner by said motor, having a motor control unit for commutating the motor and regulating the position of the actuating member, it being possible to supply position signals, which correspond to the position values detected by the position sensor, to the motor control unit.

BACKGROUND

In a method of this type, it is known that the position sensor at the output of the actuating drive for the position regulation derives information for the commutation process. However, the current flow pattern has to be exemplarily determined by manufacturing tolerances and individually stored in a non-volatile manner in the drive electronics. Play in the gear mechanism, which changes further during the operating period, leads to unpredictable phase errors and to poor commutation results.

In addition, the position sensor can also change its signals over the operating period and at relatively high temperatures which are not taken into account by one-off exemplary determination. The use of extremely precise and stable position sensors is complicated and costly.

The object of the invention is therefore to provide a method and an actuating drive of the type mentioned in the introduction by means of which method or actuating drive accurate-phase commutation of the electrically commutated motor is achieved together with a simple design of the commutation and position regulation device.

SUMMARY

According to the invention, this object is achieved in that, after the actuating drive is started, uncompensated measured values are detected by the position sensor over at least one full revolution of the rotor or of the element which can be driven in a rotatable manner, corresponding correction values for compensating angle errors are formed in a compensation unit, and the correction values are fed to a memory unit for storage purposes, and in that the errors in the position values, which are detected during further operation, are compensated with the correction values and are fed to a commutation unit and/or to a position regulation unit of the motor control unit.

After starting means either immediately after the actuating drive is electrically switched on or during operation under predetermined operating conditions.

This method leads to accurate-phase commutation of the motor with a high degree of efficiency, improved rotation and good dynamic position regulation. Exemplary compensation of manufacturing tolerances is not required since the method can calibrate itself with each switch-on process and furthermore wear, which adds up as the service life increases, and temperature dependencies are continuously compensated.

Furthermore, a very inaccurate, small and therefore low-cost position sensor can be used.

One advantageous procedure involves the position values being processed as sine angle signals and cosine angle signals and being supplied to the compensation unit, with the extreme values of the sine angle signals and the cosine angle signals being determined in the compensation unit, and offset correction values and amplitude correction values being calculated from these extreme values, and these offset correction values and amplitude correction values being fed to the commutation unit and/or to the position regulation unit of the motor control unit.

In addition, the angular deviation between a zero position of the rotor of the motor or of the element which can be driven in a rotatable manner and of a zero position of the position sensor is determined by the compensation unit and fed to the commutation unit and/or to the position regulation unit.

The zero position of the rotor or of the element which can be driven in a rotatable manner can be a predetermined actuated electrically enforced position of the motor (saddle point) and the zero position of the position sensor can be determined by the installation position. In this case, a plurality of saddle points can also be determined, with each saddle point preferably being approached during stepper motor operation.

After one complete revolution, an average value of all the angular deviations between the saddle points through the electrically enforced phases of the rotor or of the element which can be driven in a rotatable manner and of the angle values, which are measured at these positions, of the position sensor can be formed and fed to the commutation unit for zero point correction for commutation purposes.

This method provides highly accurate angle information for commutation and position regulation purposes, and so the degree of efficiency of the motor and the regulation accuracy are increased.

After compensation of the position sensor signal for commutation of the motor, a lever connection or the actuating member is moved to a reference position by the motor, and the rotary angle position detected there is fed to the memory unit as a reference position in order to provide an indication for position regulation of the position regulation unit.

In this case, the reference position can be defined by a mechanical stop, into which reference position the lever connection or the actuating member is moved.

An initialization phase can be performed after electrical switch-on and preferably after compensation of the position sensor is complete.

Even greater accuracy over the service life is achieved by additional compensation operations in predetermined operating states during operation as a function of one or more detected physical variables, it being possible for the physical variables to be one or more determined temperatures, in particular operating temperatures of the actuating drive.

In an actuating drive for carrying out the method, the memory unit may be a volatile memory unit or a non-volatile memory unit.

In principle, any type of magnetic, inductive or capacitive position sensor can be used.

However, it is cost-effective for the position sensor to have a magnetoresistive angle sensor, a Hall sensor or an inductive sensor by means of which the magnetic field of the rotor magnet or magnets of the motor or of a magnet which is arranged on the motor shaft or on the element which can be driven by the motor can be detected.

The element which can be driven in a rotatable manner by the motor may be an intermediate gear between the motor shaft and the actuating member.

The actuating member is preferably an actuating member of a motor vehicle, it being possible for the actuating member to adjust the blade geometry of a turbocharger, or charge motion valves or a variably adjustable valve drive. The connection between the actuating member and the actuating drive can be established via a lever connection.

Further options involve it being possible to adjust the gear mechanism shifting means or a throttle valve or an exhaust gas control valve or an exhaust gas bypass valve using the actuating member.

BRIEF DESCRIPTION OF THE DRAWINGS

An exemplary embodiment of the invention is illustrated in the drawing and will be described in greater detail in the text which follows. The single FIGURE of the drawing shows a basic illustration of an actuating drive for carrying out a method for operating the actuating drive.

DETAILED DESCRIPTION

The illustrated actuating drive exhibits an electrically commutated motor 1 whose motor shaft 2 is fitted with a radially magnetized permanent magnet 3.

A lever connection 5 for an adjustable actuating member (not illustrated) can be adjusted by the motor shaft 2 via a gear mechanism 4.

A position sensor 6, which has a sensor 7, which can be influenced by the magnetic field of the permanent magnet 3, and a signal processing unit 8, is arranged radially with respect to the permanent magnet 3.

The signal processing unit 8 is used to process the signals of the sensor 7 into sine voltage signals Usinα' and a cosine voltage signal Ucosα', and these signals are supplied to a motor control unit 9 and are converted into digital sine angle signals and cosine angle signals there by an A/D converter 10.

The extreme values of these sine angle signals and cosine angle signals are then determined from these sine angle signals and cosine angle signals in a compensation unit 11, and offset correction values and amplitude correction values are calculated from said extreme values, and angle signals which are compensated in accordance with trigonometric calculations are formed, and supplied to a commutation unit 12 and to a position regulation unit 13 and stored in a memory unit 14.

For the purpose of position regulation in accordance with an input control signal 15, a corresponding compensated angle signal is supplied by the position regulation unit 13 to the commutation unit 12 and the motor 1 is driven by the commutation unit 12 via a driver stage 16.

Furthermore, the drive signal of the driver stage 16 is also fed to the compensation unit 11 for zero point correction for a learning process for the electrically enforced saddle point phases.

A voltage for supplying power to the components of the motor control unit 9 is supplied to a voltage supply unit 18 via an energy connection 17.

What is claimed is:

1. A method for operating an actuating drive having an electrically commutated motor for adjusting an actuating member, having a position sensor for detecting the rotary angle position of the rotor of the motor or of a rotatable element which can be driven in a rotatable manner by said motor, having a motor control unit for commutating the motor and regulating the position of the actuating member, wherein position signals, which correspond to the position values detected by the position sensor, are supplied to the motor control unit, the method comprising:

after the actuating drive is started, detecting uncompensated measured values by the position sensor over at least one full revolution of the rotor or of the element which can be driven in a rotatable manner, generating corresponding correction values for compensating angle errors in a compensation unit, and communicating the correction values to a memory unit for storage purposes, detecting errors in the position values during further operation of the actuating drive, calculating compensation signals values to compensate for the detected errors, based on the stored correction values, determining a zero position angular deviation between (a) a zero position of the rotor of the motor or of the rotatable element and (b) a zero position of the position sensor, the zero position of the rotor or of the rotatable element being a predetermined actuated electrically enforced position of the motor, and the zero position of the position sensor being determined by an installation position, and communicating the compensation signals and the zero position angular deviation to at least one of a commutation unit and a position regulation unit of the motor control unit.

2. The method as claimed in claim 1, wherein the position values are processed as sine angle signals and cosine angle signals and are supplied to the compensation unit, with the extreme values of the sine angle signals and the cosine angle signals being determined in the compensation unit, and offset correction values and amplitude correction values being calculated from these extreme values, and these offset correction values and amplitude correction values being fed to the commutation unit and/or to the position regulation unit of the motor control unit.

3. The method as claimed in claim 1, wherein an average value of the angular deviations between a plurality of predetermined actuated electrically enforced positions of the rotor or of the element which can be driven in a rotatable manner and measured values of the position sensor at the electrically enforced positions is formed and fed to the commutation unit in order to correct the commutation.

4. The method as claimed in claim 1, wherein, after compensation of the measured position values, a lever connection or the actuating member is moved to a reference position by the motor, and the compensated rotary angle position detected thereafter is fed to the memory unit as a reference position in order to provide an indication for position regulation of the position regulation unit.

5. The method as claimed in claim 4, characterized in that the reference position is defined by a mechanical stop, into which reference position the lever connection or the actuating member is moved.

6. The method as claimed in claim 1, wherein the element which can be driven in a rotatable manner is a gear of a gear mechanism which is connected downstream of the motor.

7. The method as claimed in claim 1, wherein an initialization phase is performed after compensation when the actuating drive is first operated.

8. The method as claimed in claim 1, wherein an initialization phase is performed after compensation each time the actuating drive is started.

9. The method as claimed in claim 1, wherein extended or dynamic compensation is performed as a function of one or more detected physical variables.

10. The method as claimed in claim 9, wherein the physical variables are one or more determined temperatures, in particular operating temperatures of the actuating drive.

11. An actuating drive, comprising:
an electrically commutated motor for adjusting an actuating member,
a position sensor for detecting the rotary angle position of the rotor of the motor or of an element which can be driven in a rotatable manner by said motor,
a motor control unit for commutating the motor and regulating the position of the actuating member, wherein position signals, which correspond to the position values detected by the position sensor, are supplied to the motor control unit,
wherein the actuating drive is programmed such that, after the actuating drive is started, uncompensated measured values are detected by the position sensor over at least one full revolution of the rotor or of the element which can be driven in a rotatable manner, corresponding correction values for compensating angle errors are formed in a compensation unit, and the correction values are fed to a memory unit for storage purposes, and the errors in the position values, which are detected during further operation, are compensated with the correction values and are fed to at least one of a commutation unit and a position regulation unit of the motor control unit, and
wherein the actuating drive is further programmed to perform an additional compensation as a function of one or more detected physical variables.

12. The actuating drive as claimed in claim 11, wherein the position sensor has a magnetoresistive angle sensor, a Hall sensor or an inductive sensor by means of which the magnetic field of the rotor magnet or magnets of the motor or of a magnet which is arranged on the motor shaft or on the element which can be driven by the motor can be detected.

13. The actuating drive as claimed in claim 11, wherein the element which can be driven in a rotatable manner by the motor is an intermediate gear between the motor shaft and the actuating member.

14. The actuating drive as claimed in claim 11, wherein the actuating member is an actuating member of a motor vehicle.

15. The actuating drive as claimed in claim 14, wherein the blade geometry of a turbocharger can be adjusted by the actuating member.

16. The actuating drive as claimed in claim 14,
wherein charge motion valves can be adjusted by the actuating member.

17. The actuating drive as claimed in claim 14, wherein a variably adjustable valve drive can be adjusted by the actuating member.

18. The actuating drive as claimed in claim 14, wherein a gear mechanism shifting means can be adjusted by the actuating member.

19. The actuating drive as claimed in claim 14, wherein at least on of a throttle valve, an exhaust gas control valve, and an exhaust gas bypass valve can be adjusted by the actuating member.

20. The actuating drive as claimed in claim 11, wherein the one or more detected physical variables for the additional compensation operation comprise one or more determined temperatures of the actuating drive.

21. A method for operating an actuating drive having an electrically commutated motor for adjusting an actuating member, having a position sensor for detecting the rotary angle position of the rotor of the motor or of a rotatable element which can be driven in a rotatable manner by said motor, having a motor control unit for commutating the motor and regulating the position of the actuating member, wherein position signals, which correspond to the position values detected by the position sensor, are supplied to the motor control unit, the method comprising:
after the actuating drive is started, detecting uncompensated measured position values by the position sensor over at least one full revolution of the rotor or of the element which can be driven in a rotatable manner,
generating corresponding correction values for compensating angle errors in a compensation unit, and
communicating the correction values to a memory unit for storage purposes,
detecting errors in the position values during further operation of the actuating drive,
calculating compensation signals values to compensate for the detected errors, based on the stored correction values, and
communicating the compensation signals to at least one of a commutation unit and a position regulation unit of the motor control unit, and
wherein, after compensation of the measured position values, a lever connection or the actuating member is moved to a reference position by the motor, and the compensated rotary angle position detected thereafter is fed to the memory unit as a reference position in order to provide an indication for position regulation of the position regulation unit.

22. A method for operating an actuating drive having an electrically commutated motor for adjusting an actuating member, having a position sensor for detecting the rotary angle position of the rotor of the motor or of a rotatable element which can be driven in a rotatable manner by said motor, having a motor control unit for commutating the motor and regulating the position of the actuating member, wherein position signals, which correspond to the position values detected by the position sensor, are supplied to the motor control unit, the method comprising:
after the actuating drive is started, detecting uncompensated measured position values by the position sensor over at least one full revolution of the rotor or of the element which can be driven in a rotatable manner,
generating corresponding correction values for compensating angle errors in a compensation unit, and
communicating the correction values to a memory unit for storage purposes,
detecting errors in the position values during further operation of the actuating drive,
calculating compensation signals values to compensate for the detected errors, based on the stored correction values,
communicating the compensation signals to at least one of a commutation unit and a position regulation unit of the motor control unit, and
performing an additional compensation as a function of one or more detected physical variables.

23. The method as claimed in claim 22, wherein the one or more detected physical variables comprise one or more determined temperatures of the actuating drive.

* * * * *